US008880496B2

(12) United States Patent
Nagaralu et al.

(10) Patent No.: US 8,880,496 B2
(45) Date of Patent: Nov. 4, 2014

(54) MAP-BASED SELECTION OF QUERY COMPONENT

(75) Inventors: Sree Hari Nagaralu, Hyderabad (IN); Puneet Agrawal, Hyderabad (IN); Vijay Krishnan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 46 days.

(21) Appl. No.: 13/329,286

(22) Filed: Dec. 18, 2011

(65) Prior Publication Data

US 2013/0159276 A1 Jun. 20, 2013

(51) Int. Cl.
*G06F 17/30* (2006.01)

(52) U.S. Cl.
USPC ............................ 707/708; 707/724; 707/725

(58) Field of Classification Search
USPC .......................................... 707/724, 725, 708
See application file for complete search history.

(56) References Cited

U.S. PATENT DOCUMENTS

| 5,852,810 | A | 12/1998 | Sotiroff et al. | |
|---|---|---|---|---|
| 7,447,685 | B2 * | 11/2008 | Nye ....................................... | 1/1 |
| 7,774,342 | B1 | 8/2010 | Virdy | |
| 7,788,252 | B2 | 8/2010 | Delli Santi et al. | |
| 7,966,321 | B2 | 6/2011 | Wolosin et al. | |
| 2004/0193488 | A1 * | 9/2004 | Khoo et al. ....................... | 705/14 |
| 2006/0101005 | A1 * | 5/2006 | Yang et al. ........................ | 707/3 |
| 2008/0104019 | A1 | 5/2008 | Nath | |
| 2008/0147738 | A1 * | 6/2008 | Lester et al. ................ | 707/104.1 |
| 2008/0214166 | A1 | 9/2008 | Ramer et al. | |
| 2008/0270366 | A1 * | 10/2008 | Frank ................................... | 707/3 |
| 2009/0049051 | A1 | 2/2009 | Horowitz et al. | |
| 2009/0055087 | A1 | 2/2009 | Beacher | |
| 2009/0325607 | A1 | 12/2009 | Conway et al. | |
| 2010/0161592 | A1 | 6/2010 | Zhao | |
| 2010/0191797 | A1 | 7/2010 | Seefeld et al. | |
| 2010/0211566 | A1 | 8/2010 | Ghanekar et al. | |
| 2011/0145247 | A1 * | 6/2011 | Norris et al. ................... | 707/737 |
| 2011/0173193 | A1 | 7/2011 | Ahn et al. | |
| 2011/0196852 | A1 * | 8/2011 | Srikanth et al. ............... | 707/706 |
| 2012/0084323 | A1 * | 4/2012 | Epshtein et al. .............. | 707/776 |

OTHER PUBLICATIONS

"International Search Report and the Written Opinion of the International Searching Authority", Mailed Date: Feb. 28, 2013, Application No. PCT/US2012/068844, Filed date: Dec. 11, 2012, pp. 10.

(Continued)

*Primary Examiner* — Noosha Arjomandi
(74) *Attorney, Agent, or Firm* — Dave Ream; Jim Ross; Micky Minhas

(57) ABSTRACT

A search engine may allow a user to add and modify geographic constraints interactively through the use of a map. In one example, the user enters a search query, and the search engine determines whether the query is amenable to a geographic constraint. If the query is amenable to a geographic constraint, then the search engine may provide an interactive map through which the user may specify a geographic boundary. The search engine may then uses the geographic boundary as a constraint on the search, and may return documents that relate to the geographic area indicated by the boundary. The user may zoom in or out on the region defined by the boundary, or may move the boundary, thereby interactively focusing, de-focusing, and modifying the search based on geography.

20 Claims, 8 Drawing Sheets

(56) References Cited

OTHER PUBLICATIONS

Hu, et al., "Understanding User's Query Intent with Wikipedia", Retrieved at <<http://www.ra.ethz.ch/CDstore/www2009/proc/docs/p471.pdf>>, Proceedings of the 18th international conference on World wide web (WWW), Apr. 20-24, 2009, pp. 471-480.

Schaal, Dennis, "Is HotPads Lasso Search an Alternative to Google Hotel Finder Shape Drawing?", Retrieved at <<http://www.tnooz.com/2011/08/08/news/is-hotpads-lasso-search-an-alternative-to-google-hotel-finder-shape-drawing/, Aug. 8, 2011, 6 pages.

"Gesture-Based Search", U.S. Appl. No. 13/017,335, filed Jan. 31, 2011, 68 pages (54 pages of text, plus 14 drawing sheets).

"International Preliminary Report on Patentability," PCT Application No. PCT/US2012/068844 (MS# 334191.02), PCT Application filed Dec. 11, 2012, paper issued on Jun. 24, 2014, 7 pages.

\* cited by examiner

MAP-BASED SELECTION OF QUERY COMPONENT

BACKGROUND

Many types of queries are oriented to a particular geographic area. While some types of queries have no discernible geographic component (e.g., a search for "Javascript code to process web form"), many queries—when properly understood—are limited to a particular geographic area. For example, a query for "restaurant" is often asking "find a restaurant at a particular location." When a query is interpreted as asking for geographically limited information, search engines typically assume that the location is the user's current location. Thus, the search engine may estimate the user's location from available information (e.g., the Internet Protocol (IP) address from which the query was sent). A user often has the option to override the implied location by using text to further limit the query by geography—e.g., "restaurant 98052" or "restaurant redmond wa" may be interpreted as asking for a restaurant in the city of Redmond, Wash. in the United States. (98052 is the postal code for Redmond, Wash.) Similarly, if no geographic limitation was inferred from the query itself, the user may supply a geographic limitation using the same type of syntax that is used to override the implied limitation—e.g., adding postal code or place name to the query.

While search engines have the ability to consider geographic constraints when choosing results for a query, the ability to specify the geographic boundaries of the query is generally limited by the ability to specify a recognized, nameable place. For example, one can ask for "restaurant Chicago", or "population North America," or "travel New York City". But these ways of adding geography to a query are, for many uses, inadequate ways of specifying the geography to which the query relates.

SUMMARY

A user may specify a geographic component to a query by interacting with a map in order to specify the relevant geographic constraint. For example, a user may use an input device to draw a circle, ellipse, or other boundary around a region on a map, thereby specifying that the specified geographic boundary is to be considered when returning results to the query.

When a user inputs a text query, the search engine that processes the query may determine whether the query is amenable to adding a geographic constraint. For example, queries such as "restaurant," "population," or "travel" may be considered amenable to geographically limitations. On the other hand, queries such as "Javascript for form processing" might not be considered amenable to geographic limitation. If the query is amenable to a geographic limitation, then the system may present an interactive map interface to a user, thereby allowing the user to draw the geographic boundaries that may be used to limit the scope of the query results. The user may, for example, draw an ellipse around the geographic area on which the query is to be focused, and the selection of results shown to the user may be based on the chosen geographic area.

Geographic limitation of results may be implemented in any appropriate manner. However, in one example, documents are indexed by geographic coordinate (or plural coordinates) to which the documents relate. For example, an article that mentions "New York City" might be indexed by the coordinate (40.757685, −73.985721) (approximately the location of Times Square). Articles that mention plural geographic locations could be indexed by more than one coordinate. When a user specifies a geographic region to which a query relates, a search engine may find results that are associated with coordinates within (or near) the specified region. Since the user can interact with a map to make the bounding region larger or smaller, it is possible to view the user as zooming in or zooming out on particular regions, thereby interactively focusing and de-focusing search results by geography.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
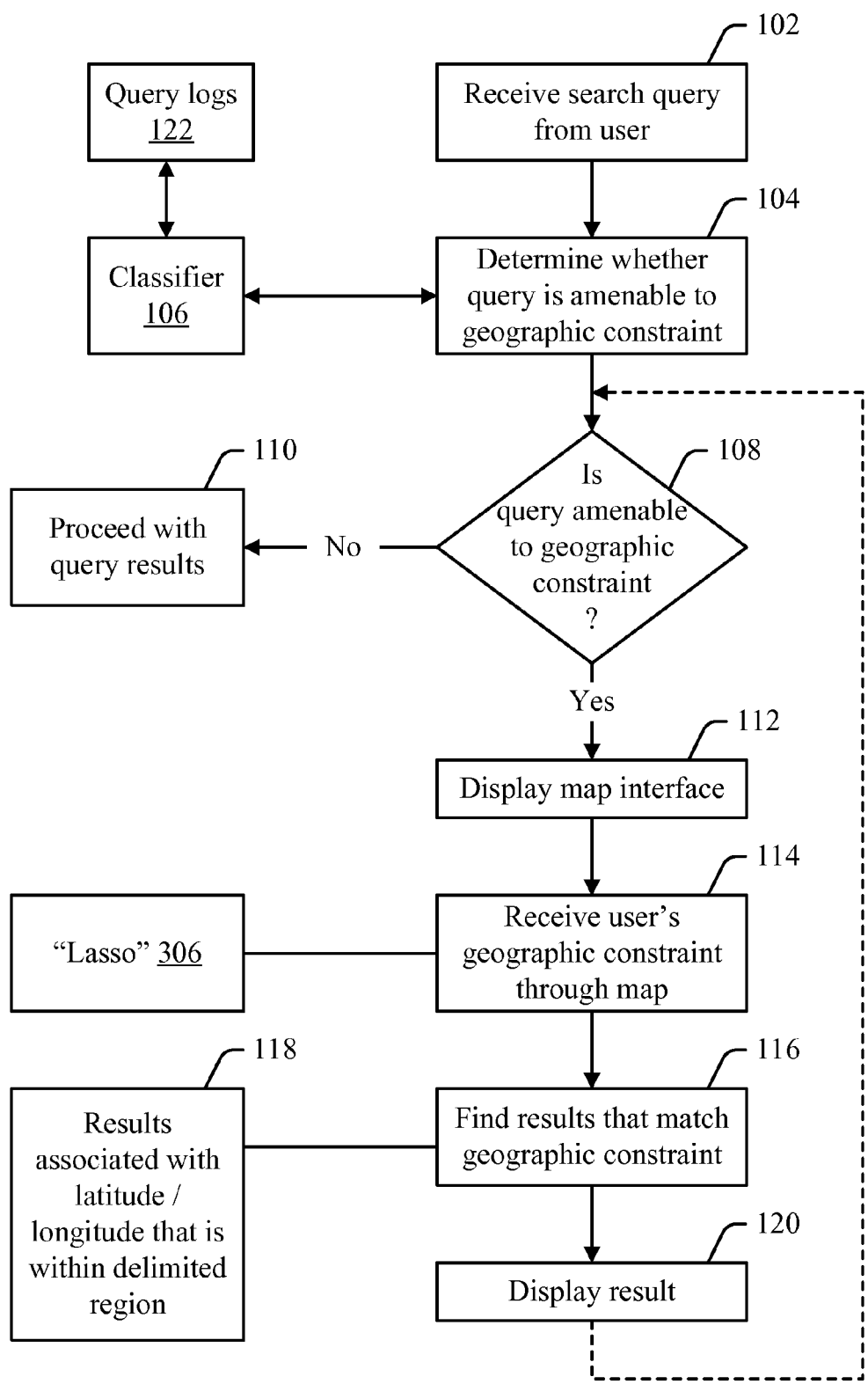
FIG. 1 is a flow diagram of an example process in which a user enters a search query and also uses a map to specify a geographic constraint on the query.

Some search queries seek documents without regard to geography. For example, a search for an abstract topic such as "C-shell scripts," "hydrocarbons," or "Stokes' Theorem" generally is understood to be seeking information without a geographic constraint. However, many queries such as "Thai restaurant," "travel," "population," and "mountain climbing" are often seeking information that is geographically limited in nature.

Many web search engines have both a general web search mode and a local search mode. For example, the BING service provided by Microsoft Corporation has options to perform a "web search" and a "local search". In the web search mode, a query is generally interpreted as seeking general web documents, while in the local search mode the query is generally interpreted as seeking specific places. For example, the query "thai restaurant" in the web search mode might return documents that contain concepts relating to Thai food (e.g., a Wikipedia article on Thai cuisine, or a newspaper review of a Thai restaurant), while the same query in the local search mode might return the names and/or web sites of specific Thai restaurants in a particular locality. The web search mode and the local search mode may have some level of "crossover". For example, even in the web search mode, the BING service might infer that the query "thai restaurant" could be seeking the names of specific Thai restaurants, so one of the results provided might be a list of local results, even if the user has issued the query in the web search mode. Moreover, the specific location associated with a query can be specified in various ways. In one example, the location is implicitly taken to be the user's current location, but the query could also be specified textually by city name (e.g., "thai restaurant redmond wa"), or by postal code (e.g., "thai restaurant 98052", where 98052 is the postal code for Redmond, Wash.).

While it is possible to include a geographic location as a condition on a query, current ways of doing so have various drawbacks. First, the method of specifying a location by text only allows a user to specify a location associated with a concise, well-recognized name (where the postal code "98052" is really a type of name, since it unambiguously identifies the city of Redmond, Wash. as accurately as the word "Redmond" does). Thus, it is possible to specify that one wants "travel in Houston" or even "travel in Texas", but not "travel in the region between the Mississippi and Colorado Rivers". Second, geographic limitations are generally understood as radiating out from a point. Thus, a search for "restaurant in Texas" is generally understood as finding restaurants that are near some arbitrarily chosen central point in the state of Texas, so that results are of decreasing significance as they get further away from that arbitrarily chosen point. The center of the specified region, however, might not hold any particular significance for the search. That is, one might want results that are ranked based on their similarity to a text query (or based on other document ranking methods), but that are constrained by a particular bounding box or curve without any favoring of results near the center of the box or curve (although the subject matter described herein does not exclude a system from using proximity to the center of the bounding box or curve as a favor in ranking results, except where such exclusion is explicitly defined by the claims).

The subject matter herein allows users to specify a geographic constraint on a query. When a user enters a text query, a search engine determines whether the query is amenable to a geographic constraint. If the query is considered amenable to a geographic constraint, the user may be shown an interactive map, and may be able to draw a boundary on the map—e.g., by using a pointing device to "lasso" a region, or to draw a bounding box or curve (such as a circle, ellipse, or polygon). The nature of drawing such a boundary is to divide the world into two regions: those that are inside the boundary and those that are outside (or, in the case where a location is a point, the two regions are the point itself, and everywhere other than the point). Search results are then chosen that are associated with locations inside the boundary. (In some implementations, results that are outside but near the boundary might also be chosen.) These results may be shown to the user. The user may interactively change the boundary on the map, thereby allowing the user to change the location of results, or to zoom in or out on a location in order to focus or de-focus the results.

When documents are indexed, the documents may be analyzed to identify the location or plural locations with which the documents are associated. This analysis may look for place words in the document (e.g., "New York City," "Great Lakes," "Texas," "Panama Canal," "Bermuda Triangle," "Bird's Nest Stadium," "98052," (a zip code), "North America," etc.), and may associate a particular coordinate (latitude and longitude) with each location. A specific place (e.g., Bird's Nest Stadium) may easily be associated with a specific latitude/longitude coordinate (39.992936, 116.396391). A larger region such as "Texas" might involve choosing an arbitrary point to represent the region. E.g., (31.968474, −99.891815) is roughly in the middle of Texas, so it could represent that state. (Or, alternatively, a large region like Texas could be represented by an area that approximates the region—e.g., a point and a radius, or a set of coordinates that define a rectangle or other polygon.) A document that mentions two locations (e.g., Panama Canal and Great Lakes) could be indexed by a set of plural coordinates (e.g., {(9.226827, −79.886227), (45.740214, −84.764328)}, representing the middle of Gatun Lake, and a point near the Straits of Mackinac, respectively). (Or, alternatively, could be represents by two areas instead of two points.) When plural geographic locations are detected in a document, the document could be indexed by both locations, or the article could be indexed by the dominant location in the article, or the article could be indexed some or all of the plural locations mentioned while also noting which is the dominant location. When the geographic constraint on a query is used to select search results, the results that are chosen may be those documents that are associated with a coordinate inside (or near) the specified boundary, or those documents whose dominant coordinate is inside (or near) the specified boundary.

It is noted that some search systems provide a map to aid in search, by either showing the user's inferred or chosen location on the map, or by allowing the user to specify, on the map, the location with which the search is to be associated. Such systems may allow the user to change the geographic point (or, possibly, a small finite set of points) with which a search is associated. However, a system that allows the user to specify a bounded region that is to be used as a condition on a search—and/or to specify this region through a map—is not an obvious variant of system that allow the user to change the point (or finite set of points) associated with a search. Nor can such a system that supports bounded-regions be derived from systems that use only a point (or finite set of points) as a search constraint. Additionally, systems that allow a user to specify a geographic constraint by drawing a boundary on a map are not obvious variants of systems that allow a user to specify both a point and a specific radius from that point. Moreover, systems that return document results (e.g., web pages) based on the documents being associated with geographic locations are not obvious variants of systems that return "place pages" or directory entries for specific businesses or other entities.

Referring now to the drawings, there is shown a process in which a user enters a search query, and also uses a map to specify a geographic constraint on the query. FIG. 1 shows a flow diagram of the overall process, and FIGS. 2-5 show an example user interface, as they would be seen by the user in various stages of the process. Before turning to a description of these figures, it is noted that the flow diagrams contained herein (both in FIG. 1 and in FIG. 6) shows an example in which stages of a process are carried out in a particular order, as indicated by the lines connecting the blocks, but the various stages shown in these diagrams can be performed in any order, or in any combination or sub-combination. Additionally, it is noted that FIGS. 2-5 show an example user experience, although the techniques described herein may be used in connection with any user experience. In particular, FIGS. 2-5 show an example in which a global map is used to augment a search experience; however, it would also be possible to use the techniques herein to add a search experience within the context of an online map application.

Figure 2:
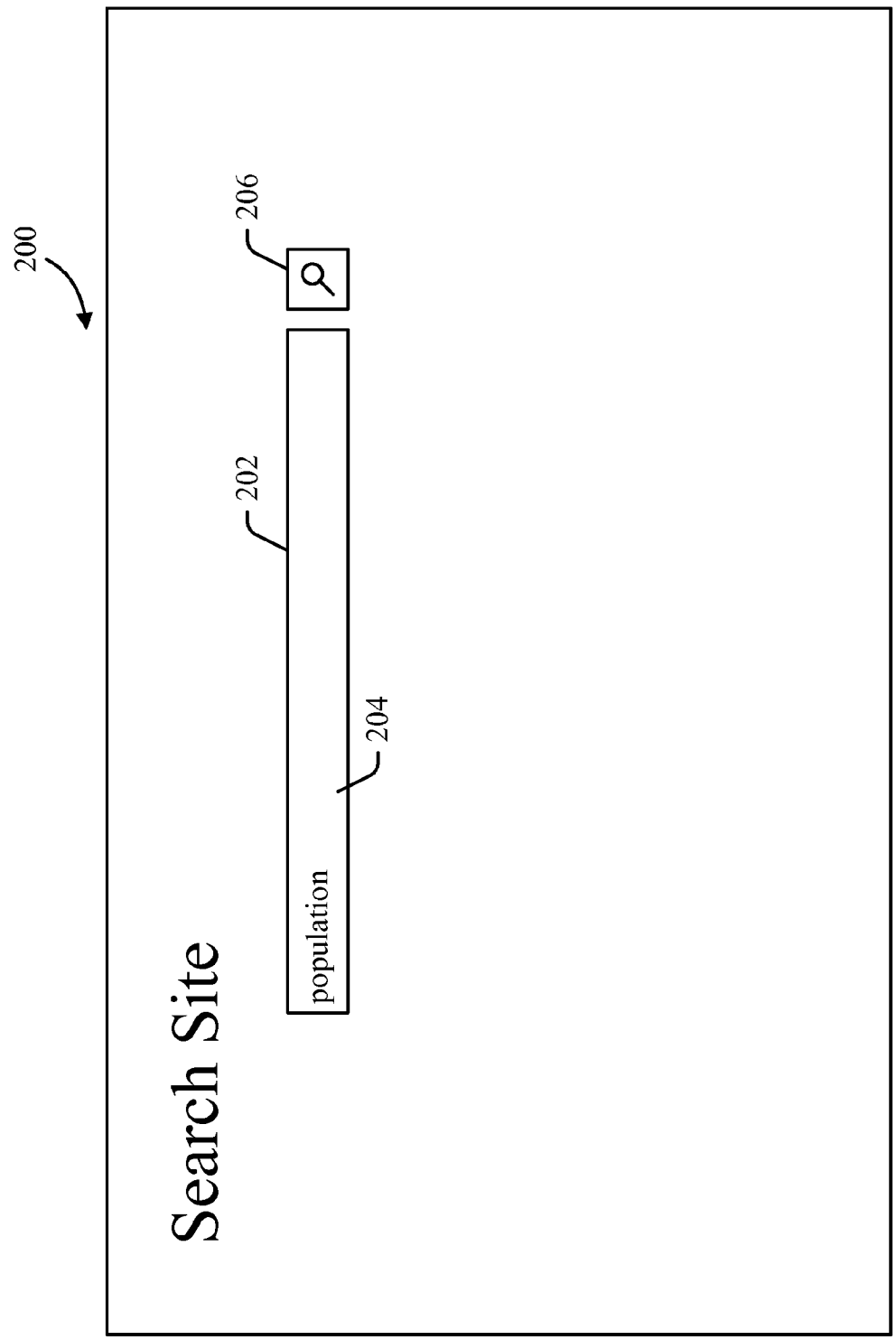
FIGS. 2-5 are block diagrams of various states of a user interface for an example search engine that uses map-based geographic constraints.

Referring now to FIG. 1, at 102, a search query is received from a user. FIG. 2 shows an example interface 200, at the stage at which a user may enter the query. As shown, interface 200 may contain a search box 202, into which the user enters the query 204. In the example shown, the query 204 that is entered is the text query "population." Interface 200 may also include a search button 206. The search button may be activated by the user to perform the search. For example, interface 200 may be the view of a search engine web page that is displayed by a browser on a personal computer, wireless telephone, navigation box, or any other device. The user may use a touch screen and/or point device to activate search button 206, thereby indicating that the search specified by query 204 is to be performed. The query may be performed by transmitting query 206 to the server of a search engine.

Returning now to FIG. 1, at 104, the search engine (or another appropriate entity that receives the query) may make a determination as to whether the query is amenable to being limited by geography. As noted above, some queries are more amenable to geographic constraints than others—e.g., "travel" and "restaurant" are the types of queries that may call for information in a specific geographic region, but a user who enters the query "C-shell scripts" is unlikely to be looking for information associated with any particular geographic location. There are various ways to determine whether a query is amenable to a geographic constraint. One such way is to treat the determination as a classification problem, in which case classifier 106 may be used to make that determination. The use of classifier 106 is discussed in greater detail below.

If it is determined (at 108) that the query is not amenable to a geographic constraint, then the search engine may proceed with providing query results (at 110), and may do so without soliciting a geographic constraint from the user. However, if it is determined (at 108) that the query is amenable to a geographic constraint, then the system may solicit a geographic constraint from the user.

One way to solicit a geographic constraint from the user is to display an interactive map at 112. An example state of interface 200 in which such an interactive map is displayed is shown in FIG. 3.

Figure 3:
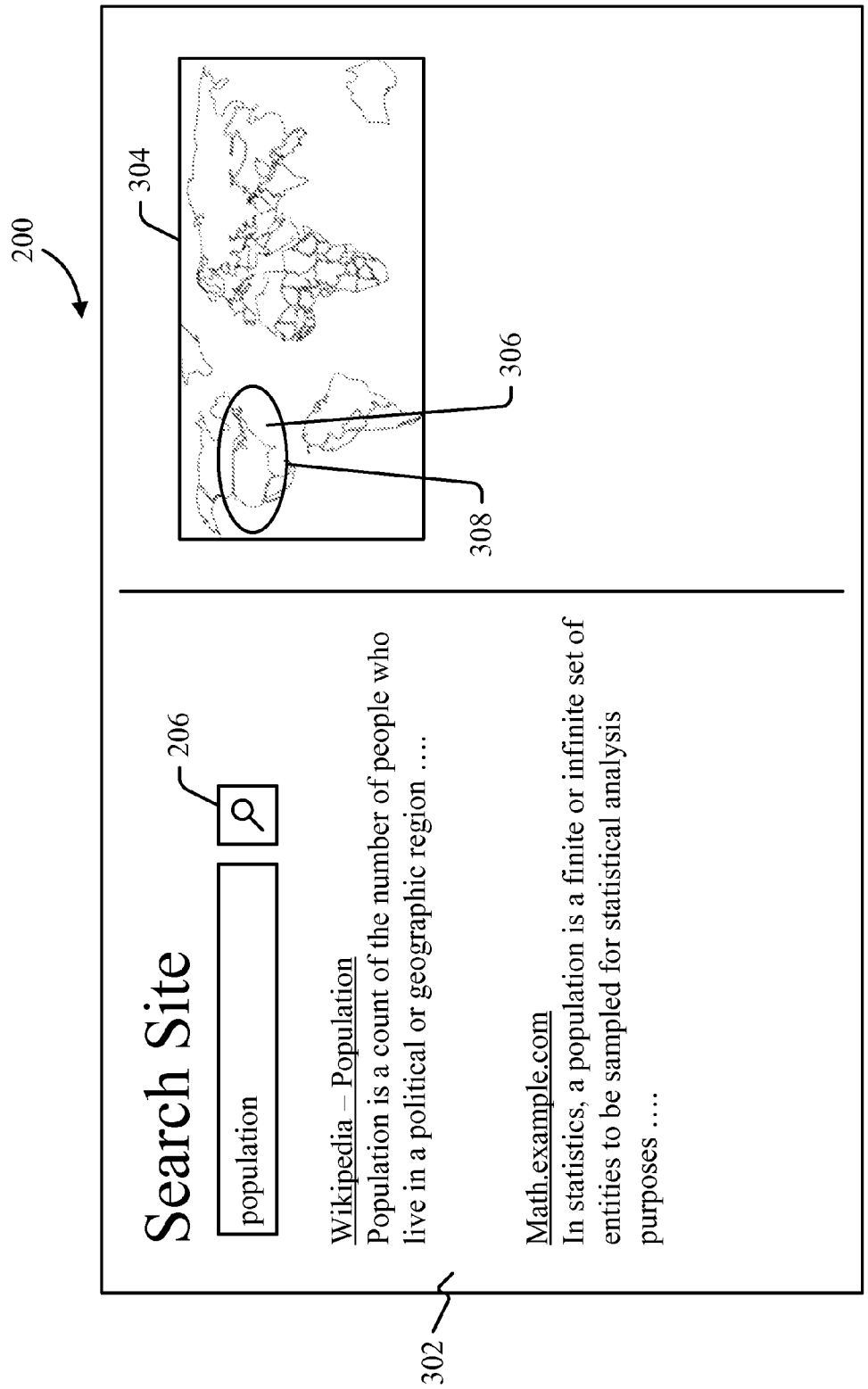

In FIG. 3, the state of interface 200 that is shown is after a search has been performed on the query "population." In one example, the search engine evaluates the query in real time as it is being entered. In another example, the search engine evaluates the query only after search button 206 is pressed. In either case, FIG. 3 shows a state in which the query "population" has been evaluated without regard to any geographic constraint. Thus, the results 302 that are shown are results that are not based on any geographic constraint. However, the search engine that is processing the query has detected that the query may be amenable to a geographic constraint. Thus, the search engine includes map 304 in the query. Map 304 may be an interactive may that allows a user to draw a boundary around a particular portion of the map. Various techniques may be used to draw the boundary—e.g., indicating the vertices of a box or other polygon, drawing a free-form curve around a region, using a "lasso" control to draw an ellipse around a region (e.g., by indicating one corner and dragging to the opposite corner, thereby unambiguously indicating the lengths and position of two elliptical axes if the axes are assumed to be aligned with the vertical and the horizontal), etc. In the example, shown, the user has drawn a lasso 306 approximately around the United States. The drawing of this lasso constitutes the user's input of a geographic constraint to the search engine. When this input is received by the search engine, the search engine may limit the search results to those documents (or other pieces of information) that are associated with locations inside of the boundary 308 represented by the lasso. It is noted that the boundary that the user draws defines what may be described as a "non-point" region of the map— i.e., a region that exists as an area rather than as a single point on the map. (It is noted that the constraint defined by the boundary might not be strict. If the boundary is not strict, then the search engine might include results that are not associated with locations inside the boundary.)

Returning now to FIG. 1, the user's indication of a geographic constraint is received at 114. As noted above, one example way to specify the constraint is through lasso 306, although the constraint could be received in one of the other ways described above, or in any appropriate manner. At 116, the search engine may find results that match the geographic constraint. One way to find such results is to find results that are associated with latitude and longitude coordinates that are inside the boundary indicated by the user (at 118) (which could be done, for example, by comparing the latitude and longitude coordinates by which the documents are indexed against the geographic constraint specified by the user). However, the results could be found in any appropriate manner.

It is noted that the description herein refers to a geographic "constraint," but such a constraint is not to be understood as a strict limitation unless otherwise indicated. Thus, a user might specify a circle of a ten-mile radius around Times Square in New York City as a geographic constraint. However, the search engine, for various reasons, might decide to provide results that are outside of this circle. In some cases, the search engine might limit results outside that boundary to those results that are very close to the boundary (e.g., within a few miles). However, in another example, the search engine might completely disregard the constraint, and might provide results from arbitrarily far outside of the boundary. While providing such results might be contrary to the spirit of a constraint, a system that provides such results is not outside the scope of the subject matter herein. When a constraint is specified, the search engine's reaction to the constraint may run a continuum from complete obedience to the constraint to complete disregard of the constraint, and all such reactions are within the subject matter herein. If a constraint is described herein, or in the claims, as being "strict," then the constraint is understood to exclude all results except for those that are located inside the constraint boundary. Otherwise, if the constraint is not described with the word "strict," then no such exclusion applies. Moreover, it will be understood that a system might consider a result to "satisfy" a constraint even if the result falls outside of the boundary that is used to define the constraint—e.g., a system might allow results to "satisfy" a constraint if they are inside the boundary or within some number of miles of the boundary.

At 120, results of the geographically-constrained query may be displayed. It is noted that to display a result includes the act of causing the result to be displayed. E.g., a server that "displays" a result on a user's device might do so by transmitting data to the user's device, thereby causing the result to be displayed on the device. Such a server is considered to be performing a "displaying" act by virtue of setting in motion the events that cause information to be displayed on a device.

Figure 4:
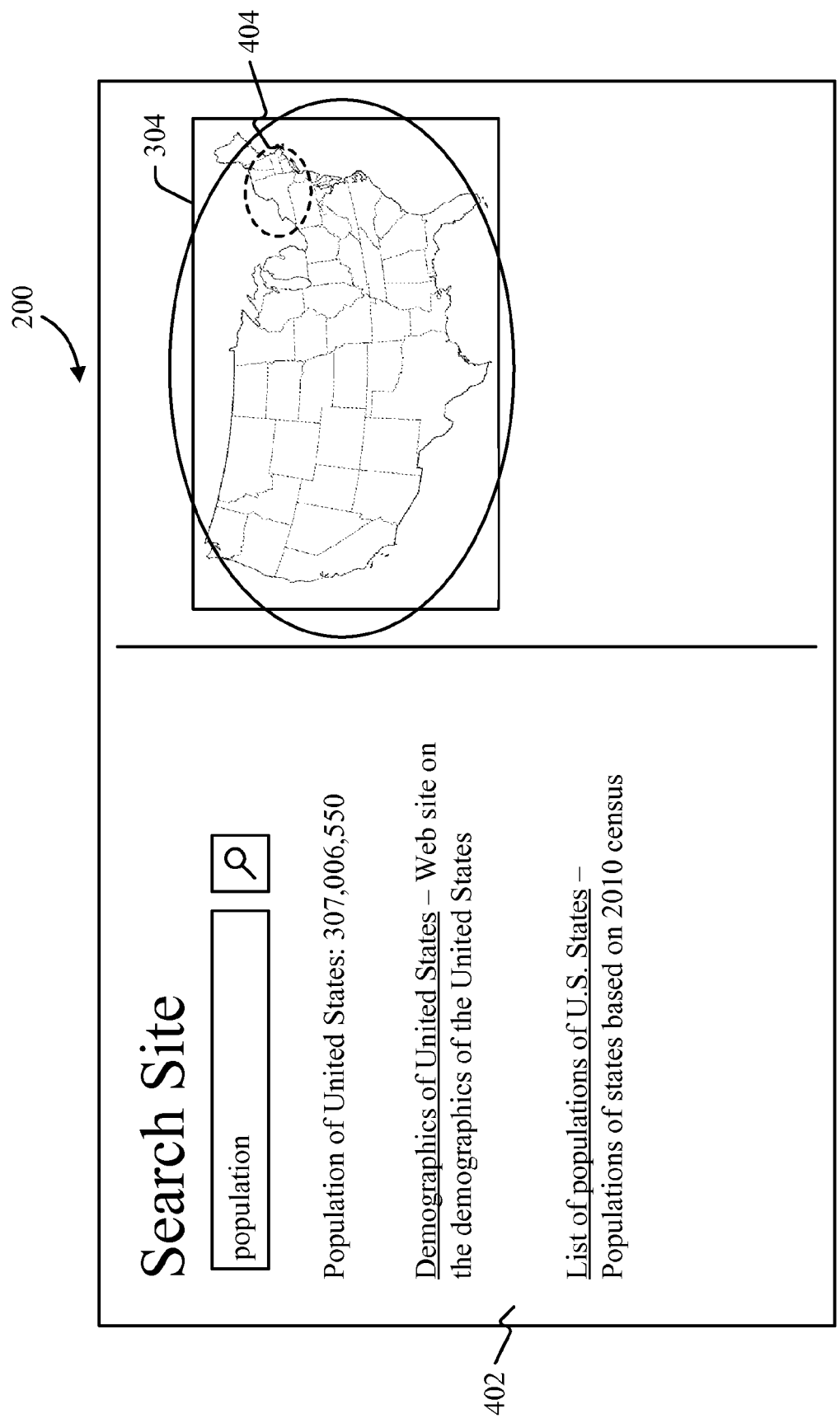

An example of the state of interface 200 in which the results are displayed is shown in FIG. 4.

FIG. 4 represents the state of interface 200 after the user has drawn a boundary around the United States, and after the search engine has processed the indication of that boundary. As can be seen, interface 200 shows a different set of search results 402 than were shown in FIG. 3. The results 402 are geographically focused on the United States. For example, one result is a document purporting to list the "population of the United States." Another result is a document entitled "Demographics of United States." Another document is a "List of populations of U.S. states." As can be seen, unlike the results 302 that were shown in FIG. 3, the results 402 that are shown in FIG. 4 are related specifically to the population of the United States, rather than to the concept of population generally. Additionally, as can be seen in FIG. 4, the zoom level of map 304 has been updated to be more closely aligned with the user's encircling of the United States.

Figure 5:
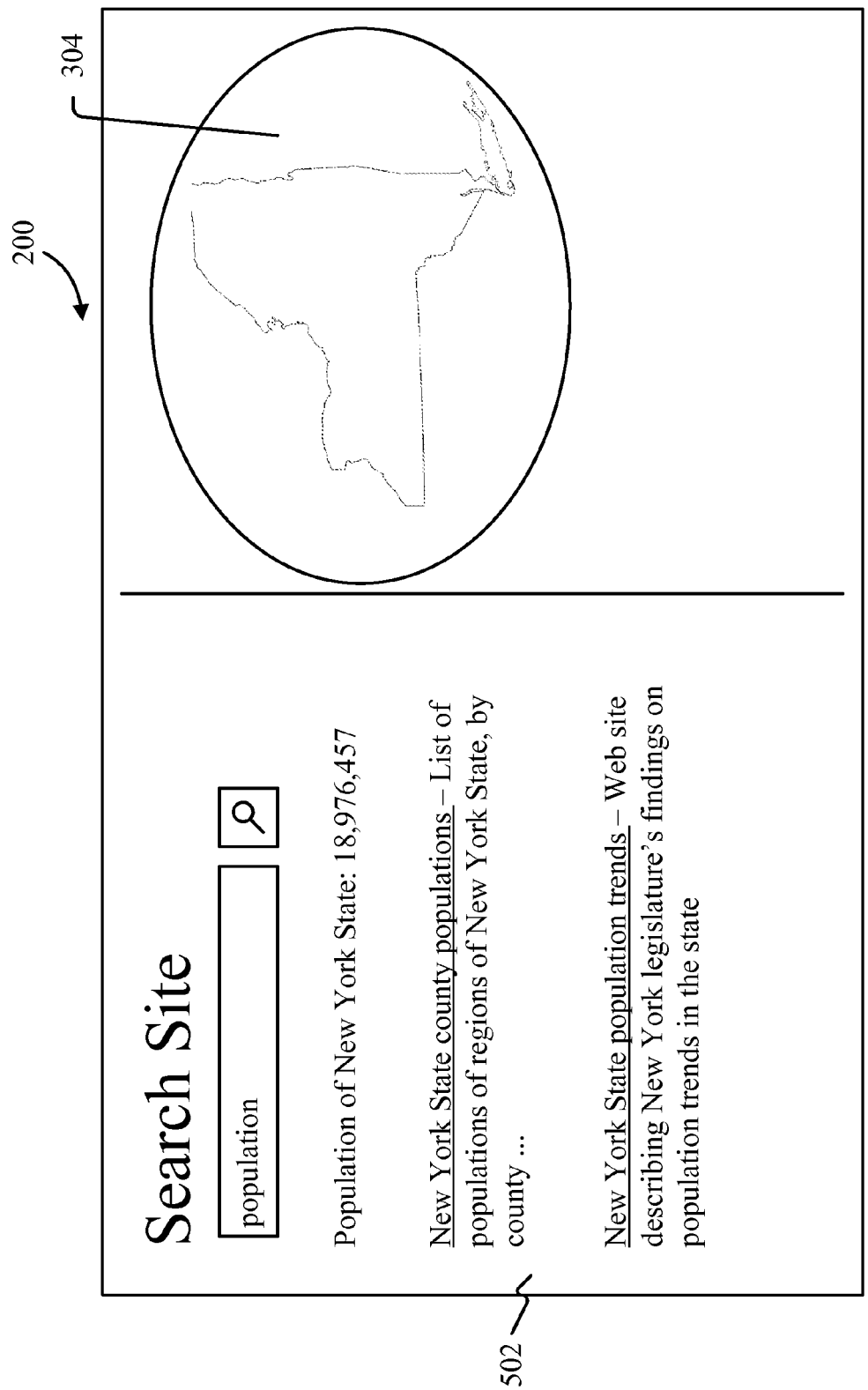

At this point, the user can provide additional geographic input. For example, the user can draw an additional lasso 404 around New York State, thereby further constraining the search to a narrower level than that of the entire United States. Returning now to FIG. 1, as can be seen by the dotted line that loops from 120 to 108, the process of constraining a query by geography, and providing new results based on the new constraint, may be performed repetitively. In one example, the user is able to zoom in and out on a geographic region, thereby focusing (narrowing) and de-focusing (broadening) the results. For example, the user might go from the United States, to the Eastern United States, to the specific eastern state of New York, and then back to the United States. Or, the user might move the geographic boundary to a different part of the world. In general, the process of changing the geographic constraint and reevaluating the query may be performed an arbitrary number of times. FIG. 5 shows an example state of interface 200 in which the geographic constraint has been narrowed to New York State (as indicated by lasso 404 of FIG. 4). As can be seen, results 502 have been updated to focus on population information about New York State (rather than population information generally as in FIG. 3, or population information about the United States as in FIG. 4). Additionally, the zoom level of map 304 has been updated to reflect the user's selection of New York State.

Returning now to FIG. 1, as noted above the act of determining whether a query is amenable to a geographic constraint (at 104) may be performed in any manner, but one example way to perform this act is to use a classifier 106. In one example, such a classifier is trained on query logs 122 to be able to distinguish queries that are amenable to geographic constraints from those that are not. Query logs 122 contain information about past queries, including the text of those queries, and whether particular instances of query text were found to be geographic in nature. One way of determining whether query text is geographic in nature is to determine whether the user entered an explicit geographic constraint, such as a postal code or city name, as part of the query. Another way to determine whether query text is geographic in nature is to determine what (if any) results were clicked by the user. For example, a search engine might be unsure of whether a query is geographic or not at the time it provides results. E.g., the query "cooking lima" might be searching for lima bean recipes, or cooking classes in the capital city of Peru. The former is not geographically limited; the latter is geographically limited. In this example, the search engine might provide one set of results about lima beans (non-geographic in nature) and another set of results about cooking in Peru (geographic in nature). Thus, the search engine might provide both types of results, and determine which result the user clicked on. The set of query texts, and the determination as to whether the query was geographic or non-geographic, effectively provides a set of examples on which a classifier can be trained using known machine learning techniques (e.g., linear regression).

Figure 6:
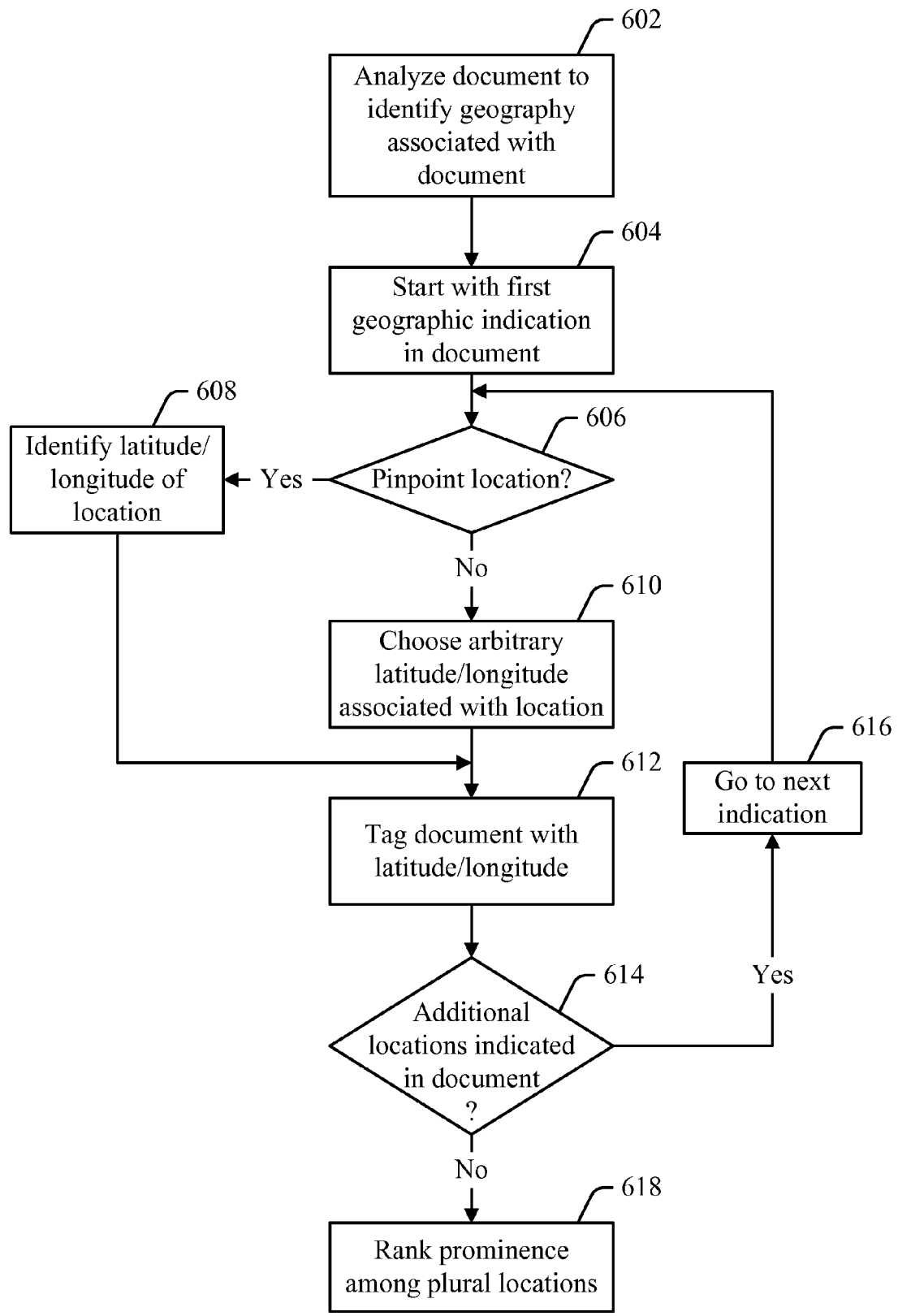
FIG. 6 is a flow diagram of an example process in which documents may be tagged with the locations to which the documents relate.

As noted above, documents may be indexed based on the geographic location(s) with which they are associated. FIG. 6 shows an example process of identifying the location(s) with which a document is associated.

At 602, the document is analyzed to identify geography associated with the document. For example, the document may be analyzed to identify indications of geography, such as words and phrases that are associated with locations—e.g., "New York," "Europe," "Safeco Field," "upper Midwest," etc. The process then cycles through the various geographic indications in the document in order to tag the document with these locations.

At 604, the process of cycling through the geographic indications starts with the first such indication. Locations may be viewed as "pinpoint" locations that refer to a specific place (e.g., "Safeco Field"), or non-pinpoint locations that refer to broader areas. If the current indication being considered refers to a pinpoint location (as determined at 606), then the latitude and longitude of that location may be identified (at 608). If the current indication is not a pinpoint location (as determined at 606), then the process may choose an arbitrary latitude and longitude (at 610) to represent the location (e.g., a point in the middle of the Straits of Mackinac, or a circle of a particular radius, or a polygon, to represent the Great Lakes region). Alternatively, the system may choose a plurality of latitudes and longitudes to represent a location that cannot be identified with specificity—e.g., "Bellevue" might refer to several different cities of that name, so the process might tag a document with the locations of all known Bellevues, and allow the search engine to use its ranking algorithm to determine the likelihood that the document relates to the geographic constraint on the search.

Whether the latitude and longitude are inherent in a pinpoint location, or are arbitrarily chosen for a non-pinpoint location, the document being analyzed may be tagged with the latitude and longitude (at 612). It is then determined whether there are any additional indications of locations in the document (at 614). If there are, then the next indication in the document becomes the current one that is under consideration by the process (at 616), and the process returns to 606 to evaluate that indication.

When there are no more indications in the document to consider, the process may continue to 618 to rank dominance among the locations. If there is only one indication of location in the document, then there is no basis to rank indications for dominance. Moreover, in some implementations, a document may be tagged with all locations referred to in the document without making any attempt to rank the locations for dominance. However, in some implementations, when a document refers to plural locations, an attempt may be made to determine which location has the highest level of prominence in the document. For example, a document might be predominantly about New York City, while also referring to other places. Text analysis techniques could be used to determine the fact that the location with the highest prominence in the document is New York City. (These text analysis techniques may use positional information—e.g., "New York City" in the title of a document might be given more weight than "New York City" in the body of the document, when determining whether New York City is the dominant location in the document.) As a result of this determination, all tags other than New York City might be removed from the index entry for the document, or the location with the highest prominence in the document might be noted in the index. In that way, a search engine that is processing a geographically constrained search can take the prominence of a location into account when deciding which of the indexed documents to return as results. For example, when a search engine is processing a geographically constrained search, the search engine might consider a document as satisfying the geographic constraint only if the geographic constraint is satisfied by the latitude/longitude of the place that is dominant in the document's text.

Figure 7:
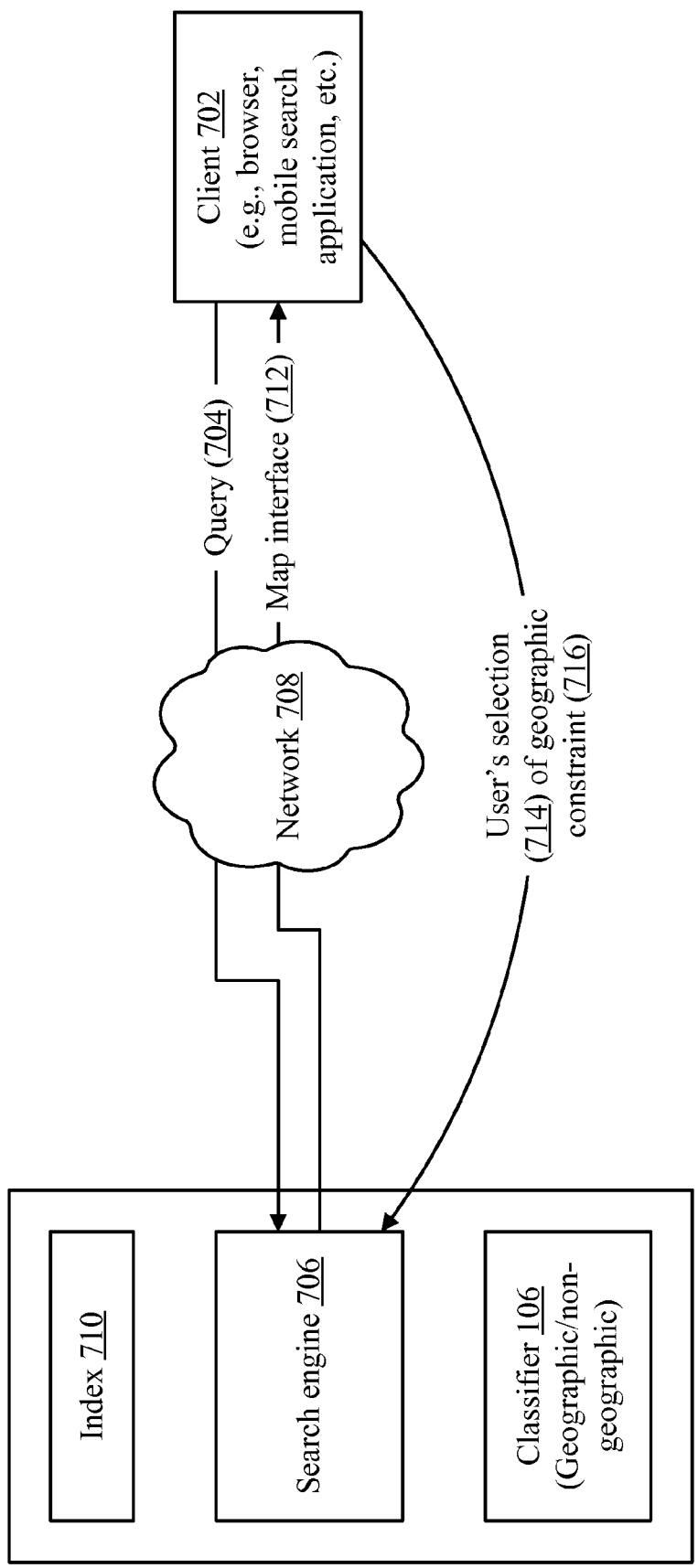
FIG. 7 is a block diagram of an example system in which geographic constraints on a search may be entered through a map.

FIG. 7 shows an example system in which aspects of the subject matter herein may be implemented. In the example of FIG. 7, client 702 is used to issue a query 704 to a search engine 706. Client 702 may be a browser, a mobile search application, or any other type of client. The query may be transmitted through a communication network 708. Search engine 706 may use an index 710, which indexes a corpus of document. The set of known document in the surface web is an example of a corpus of documents that may be indexed, although any corpus of documents could be indexed. Search engine may use a classifier 106 to determine whether query 704 is, or is not, amenable to a geographic constraint. If search engine 706 determines that query 704 is amenable to a geographic constraint, then search engine 706 may provide a map interface 712 to client 702, so that the user of client 702 can specify the geographic constraint. If such a map interface 712 has been presented to the user, and if the user has indicated a geographic constraint through the map interface, then the user's selection 714 of that geographic constraint 716 may be provided to search engine 706. Search engine 706 may then use the geographic constraint in order to select particular documents, in index 710, to be provided as results. As noted above, the documents in index 710 may be tagged with latitudes and longitudes of locations with which the documents are associated, thereby allowing search engine 706 to determine whether a document satisfies geographic constraint 716.

Figure 8:
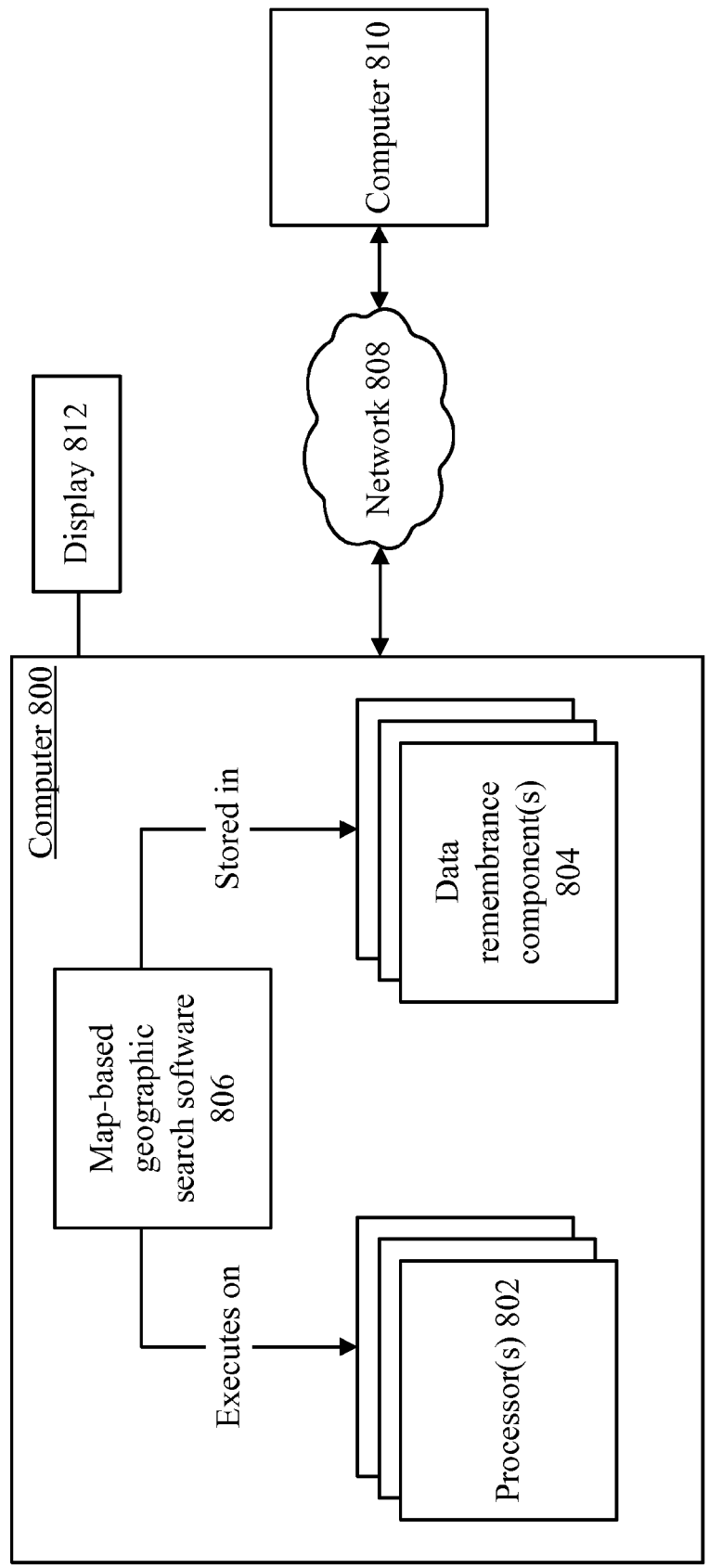
FIG. 8 is a block diagram of example components that may be used in connection with implementations of the subject matter described herein.

FIG. 8 shows an example environment in which aspects of the subject matter described herein may be deployed.

Computer 800 includes one or more processors 802 and one or more data remembrance components 804. Processor(s) 802 are typically microprocessors, such as those found in a personal desktop or laptop computer, a server, a handheld computer, or another kind of computing device. Data remembrance component(s) 804 are components that are capable of storing data for either the short or long term. Examples of data remembrance component(s) 804 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 800 may comprise, or be associated with, display 812, which may be a cathode ray tube (CRT) monitor, a liquid crystal display (LCD) monitor, or any other type of monitor.

Software may be stored in the data remembrance component(s) 804, and may execute on the one or more processor(s) 802. An example of such software is map-based geographic search software 806, which may implement some or all of the functionality described above in connection with FIGS. 1-7, although any type of software could be used. Software 806 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance component(s) 804 and that executes on one or more of the processor(s) 802. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Unless a claim explicitly describes the media as "transitory" or "ephemeral," such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 802) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 800 may be communicatively connected to one or more other devices through network 808. Computer 810, which may be similar in structure to computer 800, is an example of a device that can be connected to computer 800, although other types of devices may also be so connected.

It is noted that the subject matter herein may refer to items as being "distinct." To say that two items are distinct is to say that they are not the same as each other. For example, if a user is said to indicate two "distinct" boundaries on a map, then the distinct boundaries are not the same as each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium having executable instructions for processing a query, the executable instructions, when executed by a computer, causing the computer to perform acts comprising:
  receiving said query from a user;
  determining that said query is amenable to a geographic constraint;
  based on said determining, causing a map interface to be displayed to said user;
  receiving said user's indication of a first geographic constraint, said first geographic constraint being indicated by said user's identifying a first boundary of a non-point region on said map interface;
  finding first results such that each of said first results is associated with a location that satisfies said first geographic constraint;
  causing said first results to be displayed to said user;
  after causing said first results to be displayed to said user, receiving, from said user, an indication of a second geographic constraint, said second geographic constraint being indicated by said user's indicating, on said map interface, a second boundary of a non-point region on said map interface, said second boundary being distinct from said first boundary;

finding second results that satisfy said query and said second geographic constraint; and causing said second results to be displayed to said user.

2. The computer-readable medium of claim 1, said determining that said query is amenable to a geographic constraint being performed by acts comprising:

using a classifier that is trained on query logs to distinguish queries that are amenable to a geographic constraint from queries that are not amenable to a geographic constraint.

3. The computer-readable medium of claim 1, said first boundary being indicated by said user using a lasso control.

4. The computer-readable medium of claim 1, said first results being found by comparing said query and said first geographic constraint with an index, there being some documents in said index that are associated with a plurality of geographic locations, said acts further comprising:

determining whether said documents associated with a plurality of geographic locations satisfy said geographic constraint by determining which of the plurality of geographic locations for a given document is a dominant location for that document, and finding that a document with plural geographic locations satisfies said geographic constraint only if the dominant location for that document satisfies the geographic constraint.

5. The computer-readable medium of claim 4, said determining of which of the plurality of geographic locations is dominant being performed by ranking said geographic locations for said given document.

6. The computer-readable medium of claim 1, said first results being found by comparing said query and said first geographic constraint with an index, documents in said index being associated with latitude and longitude coordinates, said finding of said first results being performed by determining which of said documents in said index are associated with latitude and longitude coordinates that satisfy said geographic constraint.

7. The computer-readable medium of claim 1, said first results being found to satisfy said constraint only if said first results are inside said first boundary.

8. A method of processing a query, the method comprising: using a processor to perform acts comprising:

determining that a query received from a user is amenable to a geographic constraint by using a classifier that is trained on query logs to distinguish queries that are amenable to a geographic constraint from queries that are not amenable to a geographic constraint;

based on said determining, transmitting a map interface to said user to cause said map interface to be displayed on a device of said user;

receiving said user's indication of a first geographic constraint, said first geographic constraint being indicated by said user's identifying a first boundary of a non-point region on said map interface;

using an index of documents that are indexed by geographic location to find first results such that each of said first results is associated with a location that satisfies said first geographic constraint; and providing said first results to said user to cause said first results to be displayed on said device.

9. The method of claim 8, said first boundary being indicated by said user using a lasso control.

10. The method of claim 8, said acts further comprising:

after said providing of said first results to said user, receiving, from said user, an indication of a second geographic constraint, said second geographic constraint being indicated by said user's indicating, on said map interface, a second boundary of a non-point region on said map interface, said second boundary being distinct from said first boundary;

finding second results that satisfy said query and said second geographic constraint; and providing said second results to said user to cause said second results to be displayed on said device.

11. The method of claim 8, said first results being found by comparing said query and said first geographic constraint with an index, there being some documents in said index that are associated with a plurality of geographic locations, said acts further comprising:

determining whether said documents associated with a plurality of geographic locations satisfy said geographic constraint by determining which of the plurality of geographic locations for a given document is a dominant location for that document, and finding that a document with plural geographic locations satisfies said geographic constraint only if the dominant location for that document satisfies the geographic constraint.

12. The method of claim 11, said determining of which of the plurality of geographic locations is dominant being performed by ranking said geographic locations for said given document.

13. The method of claim 8, said first results being found by comparing said query and said first geographic constraint with an index, documents in said index being associated with latitude and longitude coordinates, finding of said first results being performed by determining which of said documents in said index are associated with latitude and longitude coordinates that satisfy said geographic constraint.

14. The method of claim 8, said first results being found to satisfy said constraint only if said first results are inside said first boundary.

15. A system for processing a query, the system comprising:

a memory;

a processor; and a search engine component that is stored in said memory, that executes on said processor, that receives said query from a user, that determines that said query is amenable to a geographic constraint, that causes a map interface to be displayed to said user based on said search engine component's having determined that said query is amenable to a geographic constraint, that receives said user's indication of a first geographic constraint that is indicated by said user's identifying a first boundary of a non-point region on said map interface, that finds first results such that each of said first results satisfies said query and is associated with a location that satisfies said geographic constraint, and that causes said first results to be displayed to said user, said search engine component finding said first results by comparing said query and said first geographic constraint with an index, documents in said index being associated with latitude and longitude coordinates, said search engine component finding said first results by determining which of said documents in said index are associated with latitude and longitude coordinates that satisfy said geographic constraint.

16. The system of claim 15, further comprising:

a classifier that is trained on query logs to distinguish queries that are amenable to a geographic constraint from queries that are not amenable to a geographic constraint, said search engine component determining that said query is amenable to a geographic constraint being performed by using said classifier.

17. The system of claim 15, said first boundary being indicated by said user using a lasso control.

18. The system of claim 15, said search engine component receiving, from said user, an indication of a second geographic constraint, said second geographic constraint being indicated by said user's indicating, on said map interface, a second boundary of a non-point region on said map interface, said second boundary being distinct from said first boundary, said search engine component finding second results that satisfy said query and said second geographic constraint and causing said second results to be displayed to said user.

19. The system of claim 15, said search engine component finding said first results by comparing said query and said first geographic constraint with an index, there being some documents in said index that are associated with a plurality of geographic locations, said search engine component determining whether said documents associated with a plurality of geographic locations satisfy said geographic constraint by determining which of the plurality of geographic locations for a given document is a dominant location for that document, and by finding that a document with plural geographic locations satisfies said geographic constraint only if the dominant location for that document satisfies the geographic constraint.

20. The system of claim 19, said search engine component determining which of the plurality of geographic locations is dominant by ranking said geographic locations for said given document.

\* \* \* \* \*